United States Patent Office 3,253,917

Patented May 31, 1966

3,253,917
PROCESS FOR THREE COLOR PRINTING AND RESULTANT PRINTS

Edward Daniel Flynn, 52 Haven Terrace, Parlin, N.J.
No Drawing. Filed June 19, 1962, Ser. No. 203,466
2 Claims. (Cl. 96—30)

This invention relates to a novel process for three color printing and more particularly to a novel process for three color printing utilizing four screened halftone positives, the novel halftone negatives employed therein and the four color prints resulting from such process.

It is known in the art that halftone color separation, also known as process work, is both relatively difficult and expensive. If a copy is to be reproduced in full color, it is generally necessary to make four separate negatives and four separate press plates for it.

Since colors normally photograph as black or as shades of gray, regular halftone negatives are used for color-separation work. In order to separate the colors in the original copy, the original is photographed through a series of filters. The negatives resulting therefrom referred to as continuous tone negatives are then developed and eventually printed on plates in the usual manner. The original colors are restored when the plates are run on the press in the proper colors of ink. Inasmuch as the impression from yellow, red, blue and black plates must be made on the paper one over the other to restore the full color to the finished print, the angle of the halftone screen is changed for each shot so that the resulting pattern of colored dots will not directly overlap, but will print side by side when the plates are run on the press. When screening the continuous tone negative any one of a series of four color screen angles are usually employed. Such angles are as follows:

FOUR COLOR SCREEN ANGLES

| Yellow | Red (Magenta) | Blue (Cyan) | Black |
|---|---|---|---|
| 90 | 75 | 105 | 45 |
| 90 | 15 | 75 | 45 |
| 60 | 75 | 105 | 45 |
| 60 | 15 | 45 | 90 |
| 15 | 0 | 30 | 60 |
| 75 | 60 | 90 | 120 |
| 90 | 75 | 120 | 45 |
| 0 | 15 | 75 | 45 |
| 90 | 75 | 15 | 45 |
| 90 | 15 | 75 | 135 |

In order to reduce the amount of work in the four color printing process, as well as the cost thereof, three negatives and three plates may be employed in a process referred to as three color printing and in which all the colors printed are obtained by combination of the colors: yellow, red and blue. For example, overprinting red with yellow produces orange, red with blue produces purple, blue with yellow produces green and overprinting all three gives the "effect" of black.

As with the four color processing a specific series of angles is usually employed. However, when compared with the usual four color angles it is apparent that there is no relation between the four color and the three color angles. Examples of such angles are as follows:

THREE-COLOR SCREEN ANGLES

| Yellow | Red | Blue |
|---|---|---|
| 105 | 75 | 45 |
| 15 | 75 | 45 |
| 75 | 105 | 45 |
| 45 | 15 | 75 |

While three color printing has apparent advantages there are certain disadvantages concomitant therewith. For example, inasmuch as such process employs but three angles there can only be an effect of black given, as the process is capable of reproducing but three patterns of dots, each at the above angles. Since there is no fourth, or black angles used, there cannot be a true black dot, but merely an overlapping of a portion of each of the three different patterns of colored dots printed in the process.

Another disadvantage of three color printing is that the process inks employed with four color printing cannot be employed with the three color process. Instead, special three color balanced inks must be employed which do not give the fidelity desired and which is achieved by the four color process.

It is an object of the present invention, therefore, to provide a process utilizing three colors but obtaining the results comparable to the four color process.

It is another object to provide a process employing the three colors of the three color process but which will provide a separate pattern of a fourth colored dot, that is, a distinct black dot pattern.

It is still another object of the present invention to provide a process which employs three colors but which employs the process inks of four color printing and with the resulting fidelity of four color printing.

The present invention provides for these and other apparent objects by the production of a halftone negative having two patterns of halftone dots each at different angles from each other, that is, a halftone negative which combines two angles selected from one of the series of four color angles on one piece of film. This is accomplished by positioning a first halftone positive having one of the above-mentioned angles in direct contact with a second halftone positive having a different angle therefrom and registering both positives in combination on the film. For example, if the halftone negative is to be employed to make a four color print by the three color printing process, a black halftone positive having a specific angle from the four color series is positioned with a second halftone positive having an angle corresponding to the desired color and angle selected from the four color series. Thus, a halftone negative results having a combined black angle and another desired color angle on one piece of film.

The following will serve to illustrate the process of the present invention more fully. It should be understood that while angles of:

Yellow at 90° angle
Red at 15° angle
Blue at 75° angle
Black at 45° angle are employed hereinafter, any series of the angles set forth above in the four color series as well as anv other effective series of angles may be employed.

The process of the present invention employs a continuous tone four color separation negative obtained by any one of the photographic methods known to the art. If desired, the continuous tone negative may be initially corrected by hand work, masking, dot etching, opaquing or a combination of these. From such continuous tone negatives is made a screened halftone positive corresponding to each of the four angles set forth above.

The black halftone positive of 45° angle is then positioned in direct contact and registered with the yellow halftone positive of 90° angle on a single piece of film so as to produce a halftone negative combining the black 45° angle and the yellow 90° angle. In a similar manner, the black halftone positive of 45° angle is positioned in direct contact, and registered with the red halftone positive of 15° angle on a single piece of film so as to produce a halftone negative combining the black 45° angle and the red 15° angle. Similarly, the black halftone positive of 45° angle is positioned in direct contact, and registered with the blue halftone positive of 75° angle on a single piece of film so as to produce a halftone negative combining the black 45° angle and the blue 75° angle. The result may be set forth as (a) a combined yellow-black halftone negative of 90° and 45° angles (b) a combined red-black halftone negative of 15° and 45° angles and (c) a combined blue-black halftone negative of 75° and 45° angles.

Each of the three combined halftone negatives are then processed into printing plates by stripping and plating by known methods. In the printing step only three plates and inks are employed, i.e., yellow, red and blue to produce dot patterns of the respective colors. The elimination of the black plate and ink does not affect the quality of reproduction, however, as a pattern of individual black dots will be formed by the printing of the 45° angle in the yellow, the printing of the 45° angle in the red and the printing of the 45° angle in the blue. When the three colors are printed at the same angle, one directly over the other, the combination of such colors will produce a pattern of black dots at a 45° angle and comparable to that produced in the four color printing process.

While the foregoing example describes a three color process, it is within the scope of the present invention to provide for two color processes as well. For example, if a print is desired in yellow, green and blue a green dot may be produced by providing a separate angle therefor as set forth above on each of the yellow and blue halftone negatives. Thus three angles are employed and three patterns of yellow, green and blue dots respectively are printed.

The process of the instant invention can be employed in either negative or positive printing by reversing the final negatives referred to above so as to be positives and should not be construed to be limited to negative printing by the above illustrative example.

The film employed in the process can be regular base film or thin base film.

By the term "direct contact" as used herein is meant either the positioning of the first or black positive over the second positive or the second positive over the first or black positive.

As employed in the instant invention the term "screen" refers to any screen employed in the art, for example, magenta screen, gray screen, glass screen, etc. and having any line variation, for example, from 45 line to 400 line.

What is claimed is:

1. A process for the production of three color printing using four different screen angles to produce a screened yellow halftone positive, red halftone positive, blue halftone positive and a black halftone positive in a manner known per se which comprises positioning the black halftone positive in direct contact with the yellow halftone positive and producing a combined halftone negative therefrom, positioning the black halftone positive in direct contact with the red halftone positive and producing a combined halftone negative therefrom, positioning the black halftone positive in direct contact with the blue halftone positive and producing a combined halftone negative therefrom, processing the resulting three combined halftone negatives into plates and running said plates on a press in yellow, red and blue ink respectively.

2. A process for the production of three color printing from four continuous tone negatives which comprises making a screened yellow halftone positive with a first angle from a first continuous tone negative, making a screened red halftone positive with a second angle from a second continuous tone negative, making a screened blue halftone positive with a third angle from a third continuous tone negative, making a screened black halftone positive with a fourth angle from a fourth continuous tone negative, positioning the black halftone positive in direct contact with the yellow halftone positive and producing therefrom a halftone negative combining the black angle and the yellow angle, positioning the black halftone positive in direct contact with the red halftone positive and producing therefrom a halftone negative combining the black angle and the red angle, positioning the black halftone positive in direct contact with the blue halftone positive and producing therefrom a halftone negative combining the black angle and the blue angle, stripping and plating the respective resulting combined negatives and printing each plate in yellow, red and blue respectively.

References Cited by the Examiner

UNITED STATES PATENTS 2,841,492 7/1958 Gresham ------------- 96—45

NORMAN G. TORCHIN, *Primary Examiner.*

J. T. BROWN, *Assistant Examiner.*